United States Patent
Rochin Machado et al.

(10) Patent No.: US 11,873,728 B2
(45) Date of Patent: Jan. 16, 2024

(54) EXHAUST COLLECTOR CONVERSION SYSTEM AND METHOD

(71) Applicant: General Electric Company, Schenectady, NY (US)

(72) Inventors: Jorge Mario Rochin Machado, Queretaro (MX); Jordan Scott Warton, Pasadena, TX (US); Ashish Agrawal, Houston, TX (US); Michael Anthony Acosta, Houston, TX (US); Gerardo Plata Contreras, Queretaro (MX); Miroslaw Pawel Babiuch, Julianów (PL); Frank Ociel Meza Koslowski, Queretaro (MX)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 0 days.

(21) Appl. No.: 18/101,564

(22) Filed: Jan. 25, 2023

(65) Prior Publication Data

US 2023/0184138 A1    Jun. 15, 2023

Related U.S. Application Data

(63) Continuation of application No. 17/329,820, filed on May 25, 2021, now Pat. No. 11,598,224.

(30) Foreign Application Priority Data

Jun. 15, 2020    (PL) .......................... 434311

(51) Int. Cl.
F01D 25/30    (2006.01)
F01D 9/02    (2006.01)

(52) U.S. Cl.
CPC .............. F01D 25/30 (2013.01); F01D 9/02 (2013.01); F05D 2230/80 (2013.01);
(Continued)

(58) Field of Classification Search
CPC . F01D 25/30; F01D 9/02; F01D 25/24; F01D 25/28; F05D 2230/80;
(Continued)

(56) References Cited

U.S. PATENT DOCUMENTS 3,860,359 A    1/1975  De Feo
8,511,984 B2 *  8/2013  Subbarao .............. F01D 25/305
                                                         415/211.2
(Continued)

FOREIGN PATENT DOCUMENTS

CN    105026697 B    1/2018
DE    102017111721 A1    11/2017
EP    3354868 A1    8/2018

OTHER PUBLICATIONS

Polish Search Report and Preliminary Opinion; PL Application No. P.434311; dated Jun. 15, 2020; 12 pages.
(Continued)

Primary Examiner — Jesse S Bogue
(74) Attorney, Agent, or Firm — Fletcher Yoder, P.C.

(57) ABSTRACT

A system includes an exhaust collector tunnel (32) configured to mount inside an exhaust collector (30) of a gas turbine (12). The exhaust collector tunnel (32) has a tunnel wall (33) configured to extend around a turbine shaft (17, 19) of the gas turbine (12). The tunnel wall (33) has a variable diameter (98) along at least a portion of a length of the exhaust collector tunnel (32).

20 Claims, 6 Drawing Sheets

(52) U.S. Cl.
CPC ...... *F05D 2240/12* (2013.01); *F05D 2240/60* (2013.01); *F05D 2250/292* (2013.01); *F05D 2250/324* (2013.01); *F05D 2250/90* (2013.01)

(58) Field of Classification Search
CPC ............. F05D 2240/12; F05D 2240/60; F05D 2250/292; F05D 2250/324; F05D 2250/90; F05D 2220/32; Y02E 20/16; F02C 6/00; F02C 7/00
See application file for complete search history.

(56) References Cited

U.S. PATENT DOCUMENTS

| | | | |
|---|---|---|---|
| 9,217,368 B2* | 12/2015 | Myoren | F01D 1/02 |
| 9,644,496 B2 | 5/2017 | Lopez-Parra et al. | |
| 10,563,543 B2 | 2/2020 | Vijayan et al. | |
| 2010/0269480 A1* | 10/2010 | Lindenfeld | F01D 25/30 |
| | | | 60/39.5 |
| 2011/0088398 A1 | 4/2011 | Subbarao et al. | |
| 2011/0162369 A1 | 7/2011 | Myoren et al. | |
| 2014/0026999 A1* | 1/2014 | Frailich | F01D 25/30 |
| | | | 138/39 |
| 2014/0047813 A1* | 2/2014 | Frailich | F01D 25/30 |
| | | | 60/39.5 |
| 2014/0348647 A1* | 11/2014 | Stang | F01D 11/00 |
| | | | 415/207 |
| 2015/0267565 A1* | 9/2015 | Tozzi | F01D 25/30 |
| | | | 415/211.2 |
| 2016/0356179 A1 | 12/2016 | Tennevall et al. | |
| 2017/0145844 A1 | 5/2017 | Jamiolkowski et al. | |
| 2018/0216495 A1* | 8/2018 | Drezek | F01D 25/30 |
| 2019/0170010 A1* | 6/2019 | Stein | F01D 17/143 |
| 2020/0208540 A1* | 7/2020 | Rochin Machado | F01D 25/30 |

OTHER PUBLICATIONS

Extended European Search Report of EP Application No. 21175828.9; dated Nov. 22, 2021; 7 pages.
India Office Action for IN Application No. 202114021329 dated Feb. 9, 2022; 5 pgs.

* cited by examiner

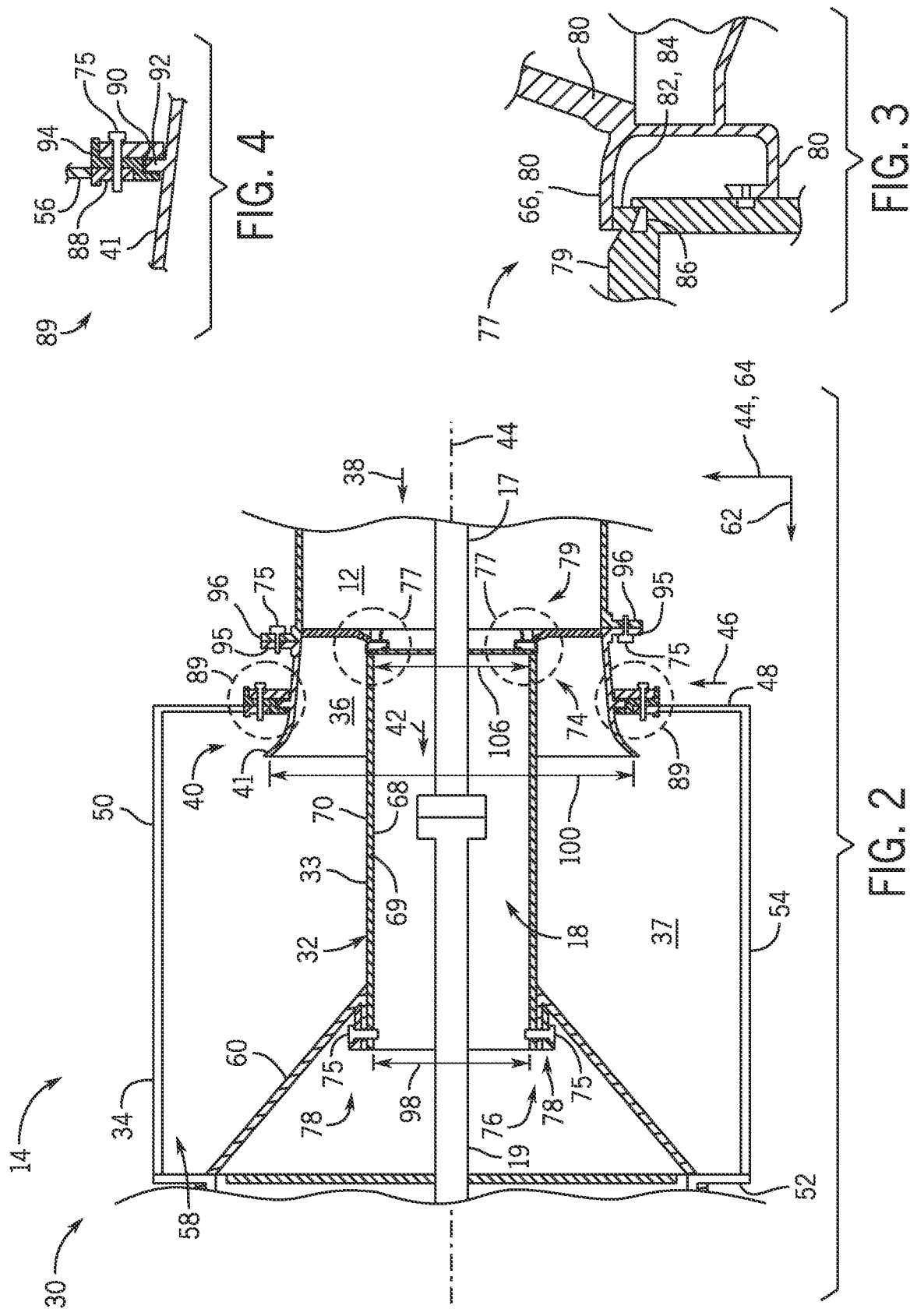

EXHAUST COLLECTOR CONVERSION SYSTEM AND METHOD

CROSS-REFERENCE TO RELATED APPLICATIONS

This application is a continuation of U.S. patent application Ser. No. 17/329,820, entitled "EXHAUST COLLECTOR CONVERSION SYSTEM AND METHOD", filed May 25, 2021, which claims the benefit of Poland Application No P.434311, filed Jun. 15, 2020, which are herein incorporated by reference in their entirety.

BACKGROUND

The subject matter disclosed herein relates to turbine systems, and more particularly to systems and methods for turbine systems with an exhaust collector.

Power generation plants, such as combined cycle power plants, often incorporate a gas turbine engine. The gas turbine engine combusts a fuel to generate hot combustion gases, which flow through a turbine to drive a load, e.g., an electrical generator. At high velocities and temperatures, an exhaust gas exits the turbine and enters an exhaust collector. Unfortunately, exhaust collectors are generally useable only with one type of turbine engine.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In a first embodiment, a system includes an exhaust collector tunnel configured to mount inside an exhaust collector of a gas turbine. The exhaust collector tunnel has a tunnel wall configured to extend around a turbine shaft of the gas turbine. The tunnel wall has a variable diameter along at least a portion of a length of the exhaust collector tunnel.

In a second embodiment, a system includes an exhaust collector configured to couple to a gas turbine. The exhaust collector includes an exhaust collector frame, an exhaust diffuser disposed in the exhaust collector frame, a diverging section disposed in the exhaust collector frame downstream from the exhaust diffuser, and an exhaust collector tunnel disposed in the exhaust collector frame between the exhaust diffuser and the diverging section. The exhaust collector tunnel has a tunnel wall configured to extend around a turbine shaft of the gas turbine. The tunnel wall has a variable diameter along at least a portion of a length of the exhaust collector tunnel.

In a third embodiment, a method includes installing an exhaust collector tunnel inside an exhaust collector of a gas turbine. The exhaust collector tunnel has a tunnel wall configured to extend around a turbine shaft of the gas turbine. The tunnel wall has a variable diameter along at least a portion of a length of the exhaust collector tunnel.

BRIEF DESCRIPTION OF THE DRAWINGS

These and other features, aspects, and advantages of the present subject matter will become better understood when the following detailed description is read with reference to the accompanying drawings in which like characters represent like parts throughout the drawings, wherein:

FIG. 2 is a cross-sectional view of an embodiment of the exhaust collector assembly of FIG. 1, illustrating a retrofit kit having a tunnel (e.g., constant diameter tunnel) that can be used to retrofit the exhaust collector assembly;

FIG. 3 is a partial cross-sectional view of the exhaust collector assembly of FIG. 2, illustrating an embodiment of a turbine connection assembly;

FIG. 4 is a partial cross-sectional view of the exhaust collector assembly of FIG. 2, illustrating an embodiment of a diffuser connection assembly;

DETAILED DESCRIPTION

Figure 1:
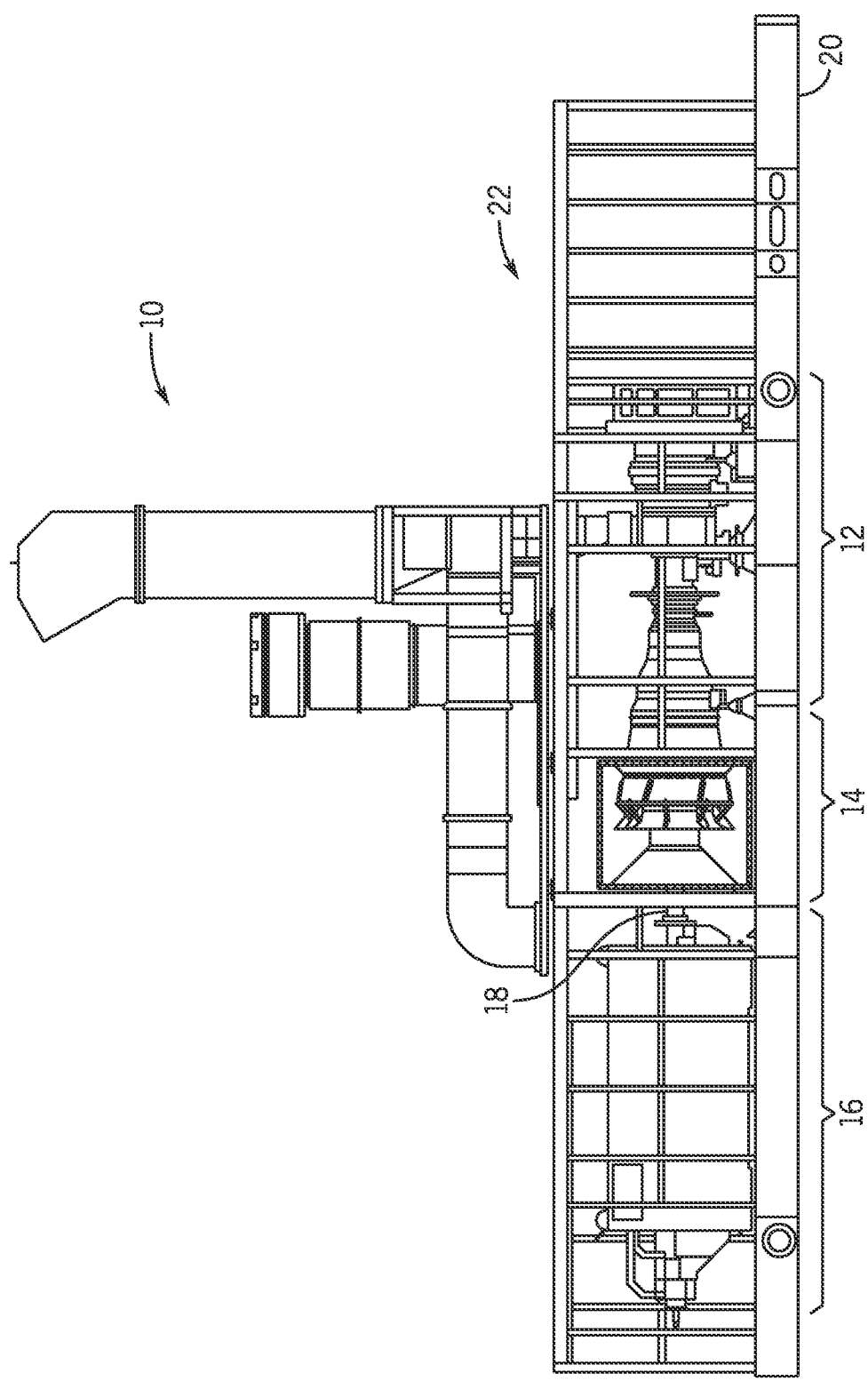
FIG. 1 is a diagram of an embodiment of a gas turbine power plant having an exhaust collector assembly, which can be modified (e.g., retrofit) with a plurality of different tunnels, diffusers, seals, and mounts.

One or more specific embodiments of the present subject matter will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present subject matter, the articles "a," "an," "the," and "said" are intended to mean that there are one or more of the elements. The terms "comprising," "including," and "having" are intended to be inclusive and mean that there may be additional elements other than the listed elements.

The disclosed embodiments include a retrofit kit for use with an exhaust collector of a gas turbine engine system. The retrofit kit includes one or more diffusers having different sizes and interfaces, a tunnel coupled to a diverging section (e.g., a conical section, deflector section) of the exhaust collector and the turbine frame via a combination of a coupling structure (e.g., bolts, brackets) and one or more enlarged seal assemblies (e.g., circumferential groove, circumferential seal segments, bolts, etc.). The tunnel may pass through a diffuser section of the gas turbine engine such that the tunnel is concentric with the diffuser section. That is, the tunnel (e.g., bore) may be thermally insulated and coupled to an exhaust collector frame, extend into a collector chamber, pass through the exhaust diffuser, and couple with the gas turbine engine. The tunnel may surround a linkage (e.g., shaft coupling of gas turbine and load shafts), thermally insulating the linkage from hot gases. The tunnel may be a retrofit or an original component of the gas turbine engine. For example, the disclosed embodiments include a retrofit kit including an exhaust collector tunnel that enables a particular exhaust system (e.g., an exhaust collector) designed for a larger turbine engine to be used with a different turbine engine by changing an interface between the exhaust collector tunnel and a gas turbine frame used to couple the tunnel to the gas turbine engine.

The retrofit kit uses one or more seal carriers to reduce leakage of exhaust gas. The tunnel has a geometry designed to transition from the gas turbine engine to the diverging section (e.g., conical section, deflector section) of the exhaust collector. For some embodiments of the gas turbine engine, the geometry of the tunnel may be cylindrical (e.g., a straight annular wall) from the gas turbine engine to the diverging section. However, for other embodiments of the gas turbine engine, the geometry of the tunnel may be variable (e.g., variable diameter annular wall) from the gas turbine engine to the diverging section. For example, the annular wall of the tunnel may gradually increase or decrease from the gas turbine engine to the diverging section. The annular wall of the tunnel may have a frustoconical shape, a curved annular shape, a stepped annular shape (e.g., annular wall with a plurality of steps in diameter), or a combination thereof. As a result, the retrofit kit enables exhaust collectors designed for a larger gas turbine engine to be used on other models of gas turbine engines (e.g., smaller engines), or vice versa, without the need for complex modifications to the exhaust collector enclosure or other package enclosures of the gas turbine engine power plant. For example, the retrofit kit may enable the tunnel to mount directly between an existing exhaust collector and gas turbine frame. Although a retrofit kit is presently contemplated for a gas turbine engine, the disclosed embodiments are not limited to a retrofit kit.

Turning now to the drawing and referring first to FIG. 1, a diagram of a gas turbine engine power plant 10 is illustrated. A gas turbine engine 12 (or gas turbine), for example an aeroderivative gas turbine engine, is coupled to an exhaust collector assembly 14. The diagram also depicts an electrical generator 16 coupled to the turbine engine 12 through a linkage 18 (e.g., rotary coupling or shaft coupling). The gas turbine engine 12, exhaust collector assembly 14, and electrical generator 16 may be securely attached to a skid platform 20. Clean air for combustion may be supplied by an air intake and filtration system 22. The air is compressed in a compressor section of the gas turbine engine 12 and mixed with a liquid fuel or gas fuel, such as natural gas. The fuel-air mixture is then combusted in a combustion chamber of the gas turbine engine 12. Hot pressurized gas resulting from the combustion of the fuel-air mixture then passes through a plurality of turbine blades in the gas turbine engine 12. The hot pressurized gas will cause the turbine blades to rotate, causing the rotation of the linkage 18. The rotation of the linkage 18 may drive a load, such as the electrical generator 16, as illustrated.

In one embodiment, the hot gas exits the gas turbine engine 12 in an axial direction and enters the exhaust collector assembly 14 downstream of the gas turbine engine 12. The gas turbine engine 12 converts a portion of the energy in the hot gas into rotary motion. However, some useful energy may still remain in the hot exhaust gas. Accordingly, the exhaust collector assembly 14 may capture and route the hot exhaust gas for further use, for example, by a heat recovery steam generator (HRSG). The HRSG may use the hot exhaust gas to generate steam for use in a steam generator and/or other equipment in the power plant 10. The hot gas exiting into the exhaust collector assembly 14 may be flowing at high velocities and contain high temperatures. By using the embodiments described in more detail with respect to FIGS. 2-10 below, the exhaust collector assembly 14 that was designed for a first gas turbine engine (e.g., a first power turbine) may be used with a second gas turbine engine (e.g., a second power turbine). The first and second gas turbine engines may different in model number, physical size, power output, and geometry of the turbine outlet or connection with an exhaust collector. However, the disclosed embodiments address these differences by adapting or retrofitting the exhaust collector assembly 14 for use with any desired gas turbine engine.

FIG. 2 illustrates a perspective view of an embodiment of an exhaust collector 30 of the gas turbine system 10, where the exhaust collector 30 is coupled to a tunnel 32 (e.g., an exhaust collector tunnel or shaft coupling tunnel). For clarity of illustration of the features of the tunnel 32, the entirety of the turbine 12, the linkage 18, the air intake and filtration system 22 of the gas turbine system 10 are not shown in FIG. 2. Components of the gas turbine engine system 10, such as the exhaust collector 30, may be disposed in one or more frames 34. The exhaust collector 30 is coupled to a diffuser 36, which is downstream of the turbine 12 relative to an inlet axis (i.e., turbine axis 38). The diffuser 36 is configured to couple to an outer wall (e.g., defining outer boundary of the exhaust flow path) of the turbine 12, while the tunnel 32 is configured to couple to an inner wall (e.g., defining an inner boundary of the exhaust flow path) of the turbine 12.

The illustrated exhaust diffuser 36 has an annular wall 40, which gradually increases in diameter in a downstream direction 42 of the exhaust flow from the gas turbine engine 12 toward the exhaust collector 30. The annular wall 40 may be described as a diverging or expanding annular wall, which diverges away from a longitudinal axis 44 in the downstream direction 42 of exhaust flow. The annular wall 40 may expand linearly (e.g., frustoconical wall) and/or curvilinearly (e.g., curved annular wall or bell shaped wall). The smaller diameter end 46 of the diffuser 36 is coupled to the gas turbine engine 12 (portion shown). The diffuser 36 diffuses (e.g., spreads out and reduces velocity of) an axial flow of the exhaust gas flowing from the gas turbine engine 12. The exhaust collector 30 receives the exhaust flow along the inlet axis from the diffuser 36 into a collector chamber 37.

The exhaust collector 30 is disposed within an exhaust collector frame 34 (e.g., enclosure) which includes a right wall 48, a top wall 50, a left wall 52, a bottom wall 54, a back wall 56, and a front wall 58. A diverging section 60 (e.g., a diverging annular wall or diverging wall) may project axially out of the left wall 52 and into the exhaust collector 30. The diverging section 60 may have a constant or substantially constant angle (e.g., deflector section or frustoconical wall) and/or a variable angle (e.g., a curved annular wall, such as a bell shape) relative to the longitudinal axis 44. For example, the angle may be approximately 20 to 70 degrees, 30 to 60 degrees, or 40 to 50 degrees. The diverging section 60 may be used, for example, to radially disperse some of the gas flow, such that the gas flow does not directly impinge against the left wall 52 in the same axial direction. As illustrated, the diverging section 60 diverges in the downstream direction 42 along the longitudinal axis 44, thereby gradually redirecting the exhaust flow from an axial direction 62 to a radial direction 64.

The tunnel 32 may be thermally insulated and coupled to the diverging section 60, extend into the exhaust collector 30, pass through the diffuser 36, and couple to the gas turbine engine 12 via a turbine frame 66 (see FIG. 3). The thermally-insulated tunnel 32 may include an annular wall 33 having one or more walls or layers made of the same or different materials. For example, the annular wall 33 may include an inner annular wall 68, an outer annular wall 70, and one or more layers of insulation 69 between the inner and outer annular walls 68 and 70. The tunnel 32 may be coaxial with the longitudinal axis 42, e.g., approximately at the axial center of the inside hollow region of the diffuser 36. The tunnel 32 may pass through a diffuser opening 72 on one end and couple to the turbine frame 66. The tunnel 32 may surround the linkage 18 (e.g., shaft coupling of shafts 17 and 19), thermally insulating the linkage 18 from the hot gas. The shaft 17 may be coupled to the gas turbine engine 12, while the shaft 19 may be coupled to a load, e.g., the electrical generator 16.

The tunnel 32 may be removably coupled to the diverging section 60 and the diffuser opening 72. By removing the tunnel 32, other tunnels (see FIGS. 5 and 8) may replace the tunnel 32, which results in a changed interface 74 between the tunnel 32 and the turbine 12. By changing the interface 74, the various tunnels 32 enable the exhaust collector 30 to be used with a multitude of gas turbine engines by retrofitting the diverging section 60 of the exhaust collector 30 to the gas turbine engine 12. For example, the same diverging section 60 may be used in the exhaust collector 30 for various different gas turbine engines 12, while the tunnel 32 varies in geometry to transition from the same diverging section 60 to different geometries of the different gas turbine engines 12. Indeed, selecting the appropriate tunnel 32 may expand the interface (e.g., larger diameter) or decrease the interface (e.g., smaller diameter) between the tunnel 32 and the gas turbine engine 12, so that the particular gas turbine engine 12 is suited for use the exhaust collector 30. Accordingly, depending on the geometry at the gas turbine engine 12 (e.g., larger or smaller diameter), the tunnel 32 may have a variety of shapes of the annular wall 33.

As discussed above, the annular wall 33 of the tunnel 32 may have a constant diameter (e.g., cylindrical wall) or a variable diameter (e.g., a converging or diverging annular wall) in the flow direction 42 from the gas turbine engine 12 to the diverging section 60. For example, a variable diameter annular wall 33 may include a linearly variable annular wall (e.g., frustoconical wall), a curvilinearly variable annular wall (e.g., a curved annular wall), or a stepwise variable annular wall (e.g., annular wall having a plurality of steps in different diameters). Depending on the particular application, the annular wall 33 may have any one or more of the foregoing geometries in various combinations with one another. In the illustrated embodiment, the tunnel 32 has a substantially straight or uniform geometry (e.g., cylindrical wall 33) with a constant or substantially constant diameter (e.g., a diameter that deviates less than one percent) and positioned coaxial with the longitudinal axis 44. The tunnel 32 is removably coupled to the diverging section 60 and the turbine frame 66. At the diverging section 60, a first end 76 of the tunnel 32 is secured to the diverging section 60 via a set of tunnel flanges 78 (e.g., circumferentially spaced flanges and/or annular flanges). The tunnel flanges 78 are bolted to the diverging section 60 and used to secure these components together via a suitable number of fasteners, e.g., threaded bolts 75. The tunnel 32 passes through the diffuser 36, and a second end 79 of the tunnel 32 is secured to the turbine frame 66 via a turbine connection assembly 77. A partial cross-sectional view of the turbine connection assembly 77 is illustrated in FIG. 3. The turbine connection assembly 77 may include a set of turbine frame flanges 80 (e.g., circumferentially spaced flanges and/or annular flanges). The second end 79 of the tunnel 32 is bolted to the turbine frame 66 and used to secure the second end 79 of the tunnel 32 to the turbine frame 66. The second end 79 of the tunnel 32 may include a first seal 82 (e.g., a circumferential or annular seal) that is disposed in an opening within a first seal groove 86 (e.g., a circumferential or annular seal groove). The seal 82 may include one or more segments 84 (e.g., circumferential seal segments), which are arranged circumferentially about the longitudinal axis 44 to make a 360 degree structure (e.g., annular seal). The seal 82 may uncoupled at the groove end so it may move freely within the opening of the first seal groove 86. The seal 82 may reduce the leakage of the hot exhaust gases and reduce the possibility of the hot exhaust gases entering the tunnel 32.

The diffuser 36 is coupled to the exhaust collector frame 34 via a diffuser connection assembly 89. A partial cross-sectional view of the diffuser connection assembly 89 is illustrated in FIG. 4. The diffuser connection assembly 89 may include a set of exhaust enclosure flanges 88 (e.g., circumferentially spaced flanges and/or annular flanges). The exhaust enclosure flanges 88 are fastened via a plurality of fasteners (e.g., threaded bolts 75) to the exhaust collector frame 34 and are used to secure these components together. The exhaust enclosure flanges 88 may include a second seal groove 90 (e.g., circumferential or annular seal groove). One or more second seal segments 92 (e.g., circumferential seal segments), disposed along an outer surface 41 of the diffuser 36, may be fastened (e.g., via threaded bolts) into the second seal segment 92 to reduce leakage of hot exhaust gases. The second seal segments 92 may be disposed circumferentially around the diffuser 36 to create a 360 degree structure (e.g., annular seal). The diffuser 36 may also be coupled to turbine frame 66 upstream of the exhaust enclosure flanges 88 via a set of outer diffuser flanges 95 (e.g., circumferentially spaced flanges and/or annular flanges). The outer diffuser flanges 95 are fastened to an outer turbine flange connection 96 via a plurality of fasteners (e.g., threaded bolts 75) to secure these components together.

As discussed above, the tunnel 32 passes through the diffuser 36. In the illustrated embodiment, the tunnel 32 and the diffuser 36 are not directly coupled together via radial struts, couplings, or other support structures. A lack of radial struts, couplings, and other support structures enables the tunnel 32 to be removed more readily from the exhaust collector frame 34. The tunnel's 32 relative size to the diffuser 36 may also enable the tunnel 32 to be more easily removed. In one embodiment, a diameter 98 (e.g., inner or outer diameter) of the tunnel 32 may be any suitable size, such as between 14 to 54 inches, 20 to 48 inches, 24 to 44 inches, or any specific diameter therebetween, while a diameter 100 (e.g., inner or outer diameter) of the diffuser 36 may be any suitable size, such as between 34 to 136 inches, 48 to 122 inches, 60 to 110 inches, or any specific diameter therebetween.

Figure 5:
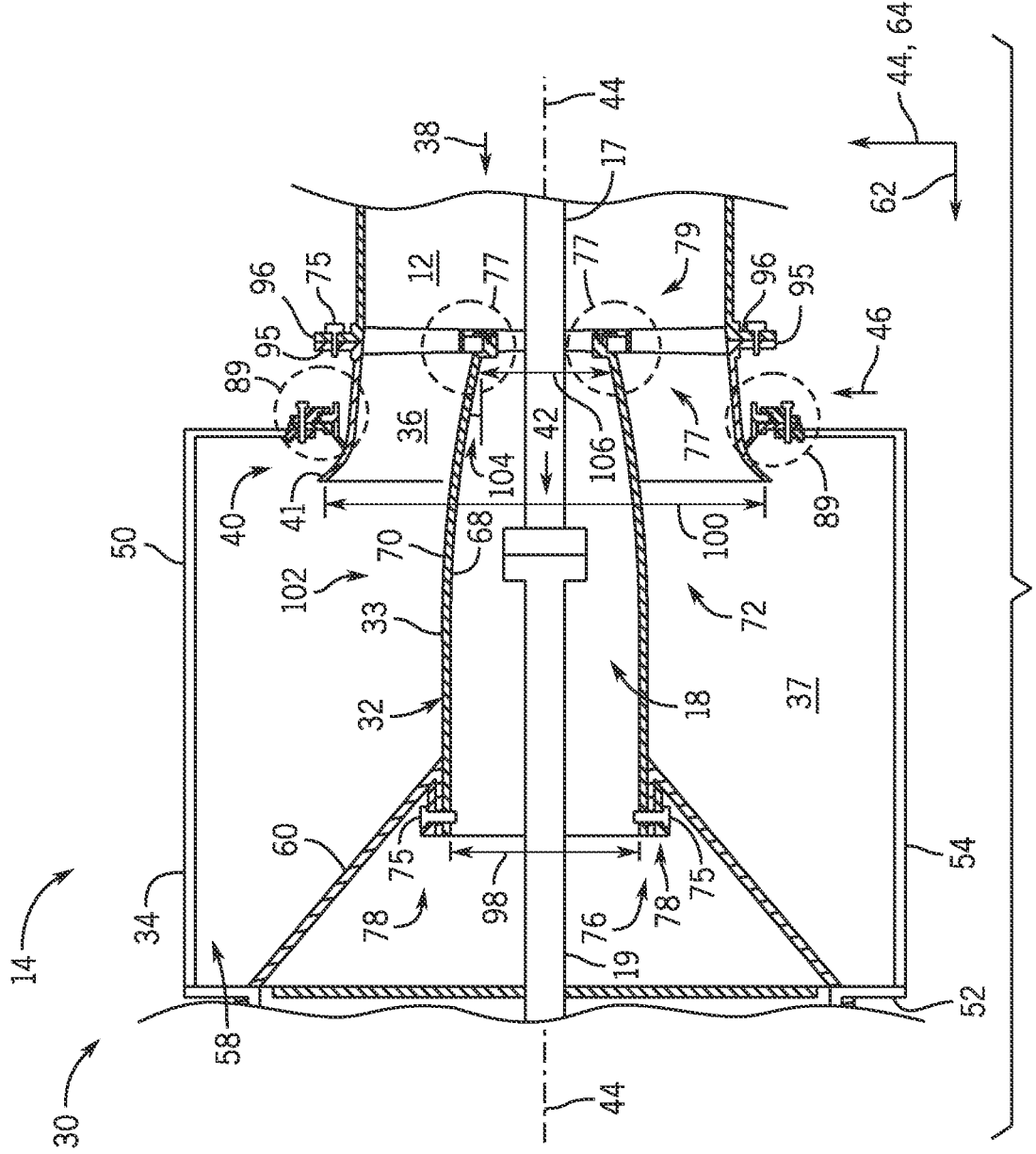
FIG. 5 is a cross-sectional view of an embodiment of the exhaust collector assembly of FIG. 1, illustrating a retrofit kit having a tunnel (e.g., variable diameter tunnel) that can be used to retrofit the exhaust collector assembly.

FIG. 5 is a cross-sectional view of the exhaust collector 30 of the gas turbine system 10 of FIGS. 1 and 2, wherein the exhaust collector 30 is modified (e.g., retrofitted) with an alternate embodiment of the tunnel 32. The components of the exhaust collector frame 34 and the diverging section 60 are substantially the same as those described above with reference to FIG. 2 and thus, the discussion of these components is not repeated. In the illustrated embodiment, the tunnel 32 has a tapered shape 102 along the annular wall 33 from the first end 76 of the tunnel 32 to the second end 79 of the tunnel 32. An angle 104 of the tapered shape 102 may be approximately 2 to 40, 3 to 35, 4 to 30, or 5 to 25 degrees along the annular wall 33. In certain embodiments, the angle 104 may be greater than a minimum angle of 1, 2, or 3 degrees and less than a maximum angle of 10, 15, 20, 25, or 30 degrees, or any combination of these minimum and maximum angles. The angle 104 may be constant or substantially constant (e.g., deviation less than 1 degree) along a portion or an entirety of the length (e.g., at least 10, 20, 30, 40, 50, 60, 70, 80, 90, or 100 percent of the length) between the first end 76 and the second end 79. If the angle 104 is constant or substantially constant, then the annular wall 33 of the tunnel 32 may be described as a tapered annular wall (or a tapered annular wall portion if less than the entire length of the annular wall 33). Alternatively or additionally, the angle 104 may be variable (e.g., varying in a curvilinear manner by at least 2, 3, 4, 5, 6, 7, 8, 9, or 10 degrees) along a portion or an entirety of the length (e.g., at least 10, 20, 30, 40, 50, 60, 70, 80, 90, or 100 percent of the length) between the first end 76 and the second end 76. For example, if the angle 104 varies in a curvilinear manner, then the annular wall 33 of the tunnel 32 may be described as a curved annular wall (or a curved annular wall portion if less than the entire length of the annular wall 33). The annular wall 33 may reduce and/or diffuse stress along the tunnel 32 by improving the capacity of the expected high stress areas of the walls 68, 70. The first end 76 of the tunnel 32 may be coupled to the diverging section 60, as discussed above with reference to FIG. 2. That is, the first end 76 of the tunnel 32 may be coupled to the diverging section 60 via the set of tunnel flanges 78 (e.g., circumferentially spaced flanges and/or annular flanges).

Figure 6:
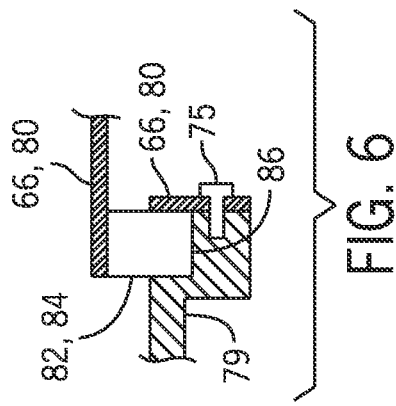
FIG. 6 is a partial cross-sectional view of the exhaust collector assembly of FIG. 5, illustrating an embodiment of a turbine connection assembly.
Figure 8:
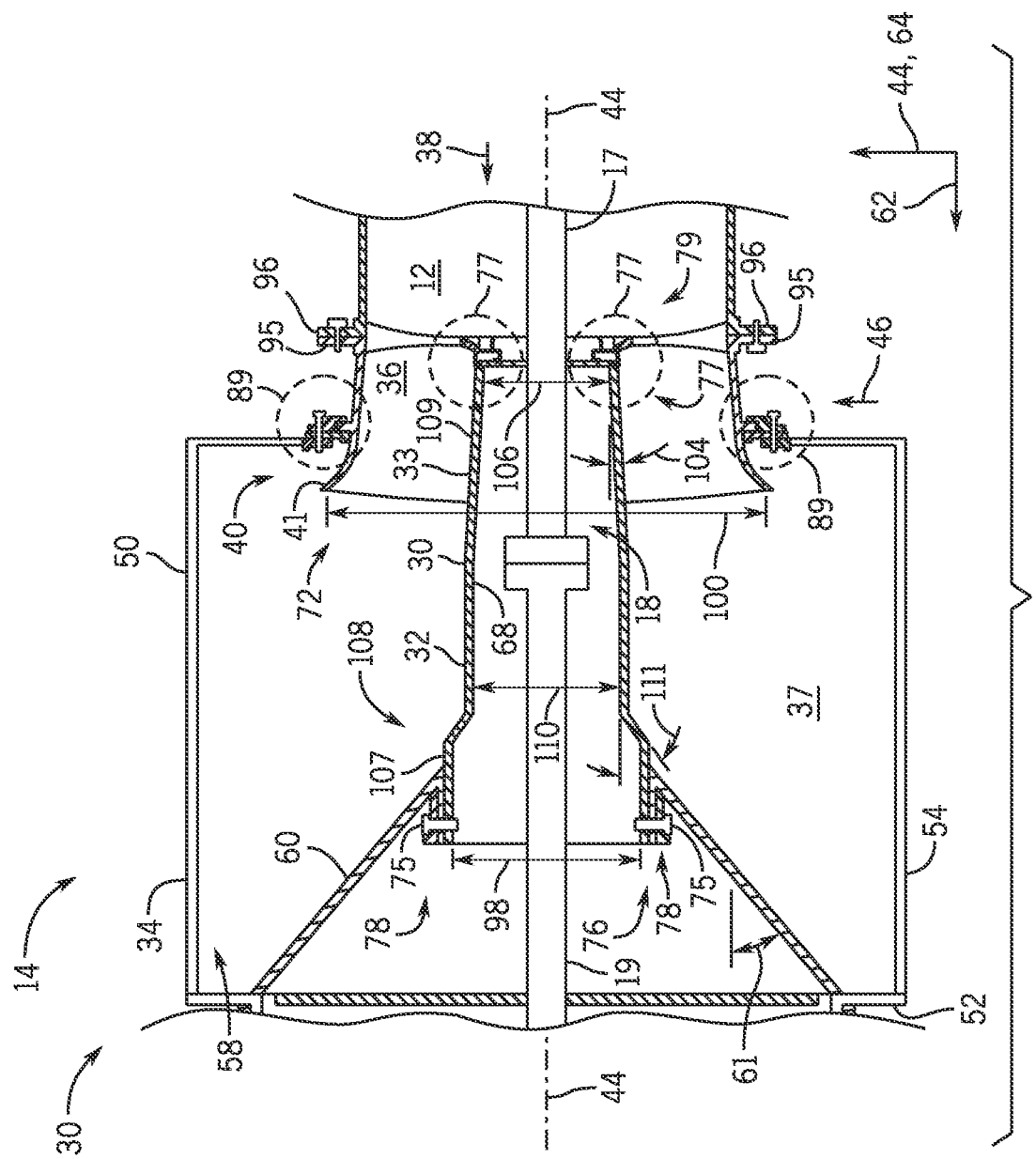
FIG. 8 is a cross-sectional view of an embodiment of the exhaust collector assembly of FIG. 1, illustrating a retrofit kit having a tunnel (e.g., stepped tunnel) that can be used to retrofit the exhaust collector assembly.

FIG. 6 is a partial cross-sectional view of an alternate embodiment of the turbine connection assembly 77, which may be used with the tapered tunnel 32 of FIG. 5 or the tunnels 32 illustrated in FIGS. 3 and 8. In the illustrated embodiment, the second end 79 of the tapered tunnel 32 may be coupled to the turbine frame bracket 80 via the one or more fasteners (e.g., threaded bolts 75). The second end 79 of the tunnel 32 and the turbine frame bracket 80 may form a first seal groove 86 (e.g., annular seal groove) for receiving the seal 82 (e.g., annular seal or circumferentially segmented seal). For example, the seal 82 may include a plurality of circumferential seal segments that are held in place in part due to the force of the turbine frame bracket 80.

Figure 7:
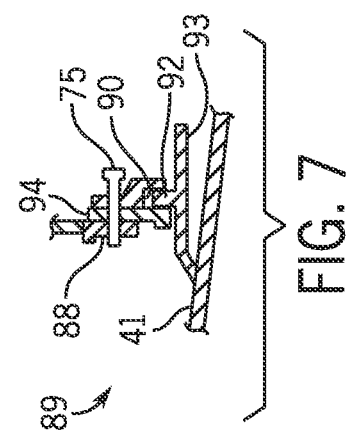
FIG. 7 is a partial cross-sectional view of the exhaust collector assembly of FIG. 5, illustrating an embodiment of a diffuser connection assembly.

FIG. 7 is a partial cross-sectional view of an alternate embodiment of the diffuser connection assembly 89, which may be used with the tapered tunnel 32 of FIG. 5 or the tunnels 32 illustrated in FIGS. 3 and 8. The diffuser connection assembly 89 may include a lip 93 that is connected (e.g., via a welded connection) to the outer surface 41 of the diffuser 36. The lip 93 (e.g., annular lip) extends circumferentially around the outer surface 41 of the diffuser 36. The lip 93 also may include the seal segments 92 arranged circumferentially around the outer surface 41 of the diffuser 36. The diffuser connection assembly 89 includes at least two diffuser brackets 94 (e.g., circumferentially spaced brackets and/or annular brackets) to create groove 90 (e.g., annular seal groove) that receives the seal segments 92. The diffuser brackets 94 may be coupled together via the fasteners, e.g., threaded bolt 75. The diffuser brackets 94 may also be coupled to the exhaust enclosure flange 88.

Referring again to FIG. 5, the first end 76 of the tunnel 32 has a diameter 98 (e.g., inner or outer diameter) sized differently (e.g., larger) than a diameter 106 (e.g., inner or outer diameter) of the second end 79 of the tunnel 32. Thus, the annular wall 33 of the tunnel 32 has a variable diameter between the first and second ends 77 and 79. The tapered tunnel 32 enables a changed interface between the second end 79 of the tunnel 32 and the turbine frame 66. For example, a ratio of the diameter 98 (e.g., inner or outer diameter) at the first end 76 relative to the diameter 106 (e.g., inner or outer diameter) at the second end 79 is greater than 1, such as at least equal to or greater than 1.05, 1.1, 1.15, 1.2, 1.25, 1.3, 1.45, or 1.5. The tapered tunnel 32 enables the diverging section 60 (e.g., the same diverging section as FIG. 2) to be used with a different diffuser 36 of a different gas turbine engine 12 (e.g., a low power turbine or other suitable turbine engine). For example, the diameter 106 and the angle 104 may be specifically selected to enable a retrofit with a different gas turbine engine 12 and/or a different diffuser 36. Accordingly, a ratio of a diameter 100 (e.g., inner or outer diameter) of the diffuser 36 relative to the diameter 106 (e.g., inner or outer diameter) at the second end 79 may be equal to or greater than 1.5, 1.75, 2, 2.25, 2.5, 2.75, or 3, for example.

In the illustrated embodiment, the diameter 98 (e.g., inner or outer diameter) of the first end 76 of the tunnel 32 may be any suitable size, such as between 12 to 50 inches, 18 to 44 inches, 22 to 40 inches, or any specific diameter therebetween, while the diameter 106 (e.g., inner or outer diameter) of the second end 79 of the tunnel 32 may be any suitable size, such as between 8 to 48 inches, 14 to 42 inches, 20 to 38 inches, or any specific diameter therebetween. In the illustrated embodiment, the diameter 100 (e.g., inner or outer diameter) of the diffuser 36 may be any suitable size, such as between 34 to 136 inches, 48 to 122 inches, 60 to 110 inches, or any specific diameter therebetween. As discussed above, the tunnel 32 and the diffuser 36 are not directly coupled together via radial struts, couplings, or other support structures, thereby enabling the tunnel 32 to be removed more readily from the exhaust collector frame 34.

Figure 9:
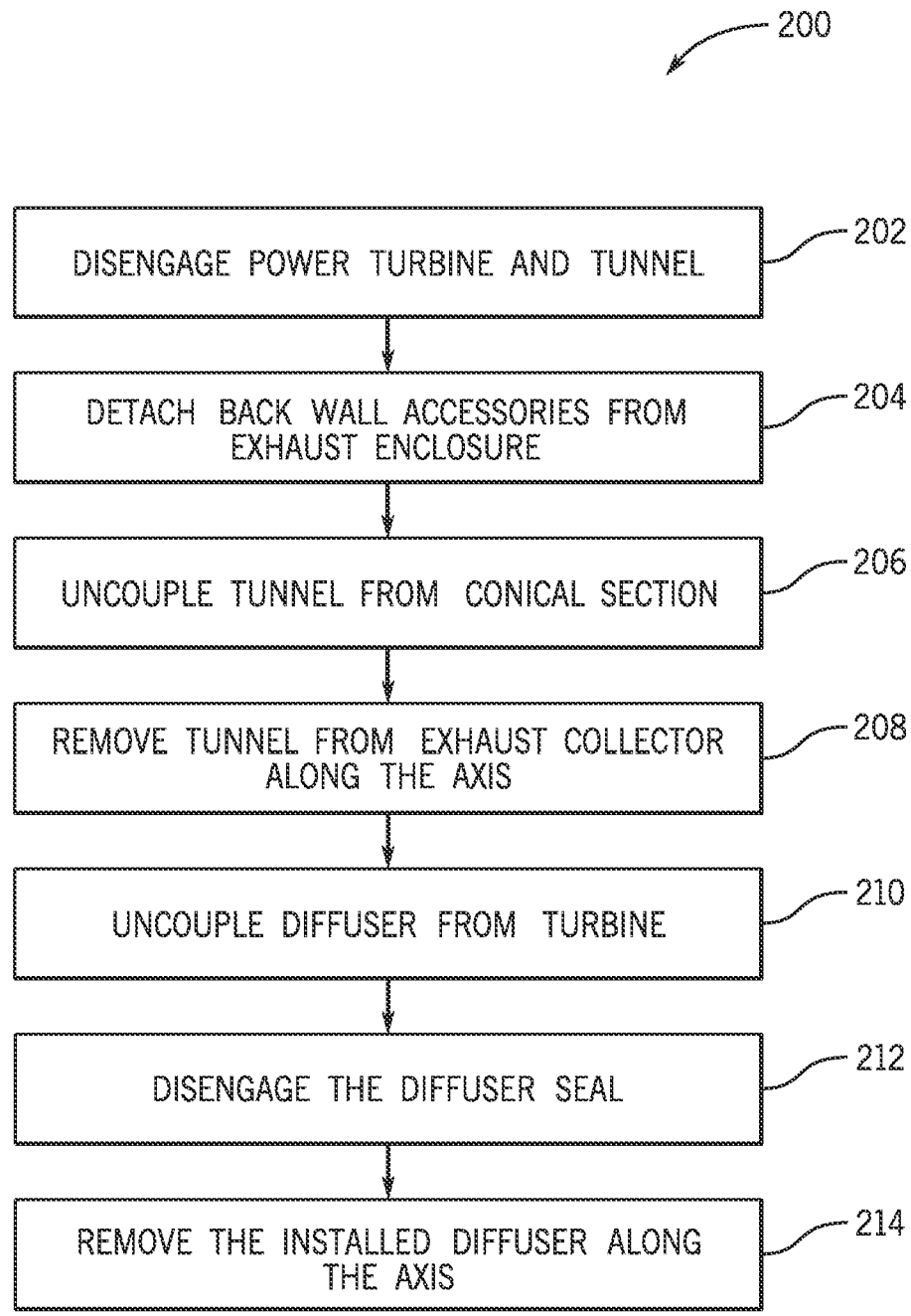
FIG. 9 is flow chart of a method of removing portions of the exhaust collector assembly in preparation of retrofitting using one of the retrofit kits of FIGS. 2-8.
Figure 10:
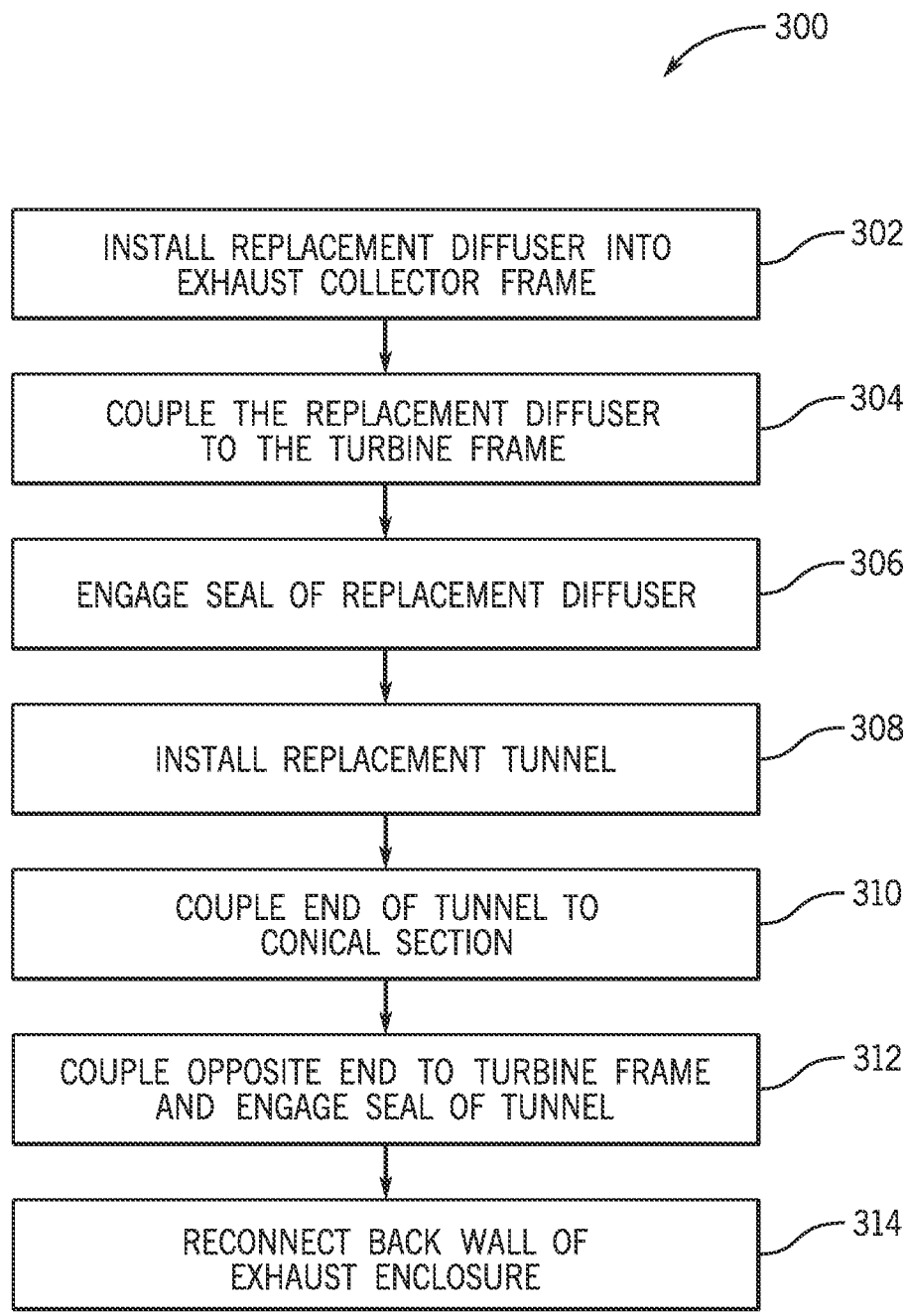
FIG. 10 is flow chart of a method of installing one of the retrofit kits of FIGS. 2-8 to modify the exhaust collector assembly of FIG. 1.

FIG. 8 is a cross-sectional view of the exhaust collector 30 of the gas turbine system 10 of FIGS. 1, 2, and 5, wherein the exhaust collector 30 is modified (e.g., retrofitted) with an alternate embodiment of the tunnel 32. The components of the exhaust collector frame 34 and the diverging section 60 are substantially the same as those described above with reference to FIGS. 2 and 5 and thus, the discussion of these components is not repeated. In the illustrated embodiment, the exhaust collector 30 of FIG. 8 has the turbine connection assembly 77 as illustrated in FIG. 9 and the diffuser connection assembly 89 as illustrated in FIG. 10. However, in some embodiments, the exhaust collector 30 of FIG. 8 may have the turbine connection assembly 77 as illustrated in FIG. 3 and/or the diffuser connection assembly 89 as illustrated in FIG. 4.

In the illustrated embodiment, the tunnel 32 has a step portion 108 (e.g., an annular step or abrupt diameter change, such as a stepped wall portion) along the annular wall 33 between the first end 76 of the tunnel 32 and the second end 79 of the tunnel 32. The step portion 108 transitions between adjacent wall portions 107 and 109 of the annular wall 33 of the tunnel 32. Although FIG. 8 illustrates only one step portion 108, embodiments of the tunnel 32 may include any number of step portions 108 (e.g., 1, 2, 3, 4, 5, 6, or more annular steps) between adjacent wall portions 107 and 109. The adjacent wall portions 107 and/or 109 may be cylindrical or tapered. Each step portion 108, such as the illustrated step portion 108, may change (e.g., reduce) the diameter of the annular wall 33 by some dimension or percentage from the wall portion 107 to the wall portion 109. For example, each step portion 108 may reduce a diameter 110 (e.g., inner or outer diameter) of the annular wall 33 by at least 1, 2, 3, 4, 5, 6, 7, 8, 9, 10, or more inches, or by at least 1, 2, 3, 4, 5, 6, 7, 8, 9, 10, or more percent relative to the diameter of the annular wall 33 (e.g., at wall portion 107) immediately before the step portion 108. In some embodiments, the step portion 108 may reduce the diameter 110 to be the same as the diameter 106 at the second end 79, or the step portion 108 may reduce the diameter 110 such than the angle 104 of the wall portion 107 is less than or equal to approximately 1, 2, 3, 4, 5, 6, 7, 8, 9, or 10 degrees. Furthermore, the step portion 108 may have an angle 111 (e.g., an acute angle) relative to the longitudinal axis 44, such as between 15 to 90 degrees, 20 to 75 degrees, 30 to 60 degrees, or 40 to 50 degrees. In some embodiments, the angle 111 of the step portion 108 may be substantially the same as an angle 61 of the diverging section 60, wherein the angle 61 is also measured relative to the longitudinal axis 44. However, the angle 111 of the step portion 108 may be different than the angle 61 of the diverging section 60, such as a greater angle to more rapidly transition to the smaller diameter 110.

Similar to the embodiment shown in FIG. 5, the first end 76 of the tunnel 32 has a larger diameter 98 (e.g., inner or outer diameter) relative to the diameter 106 (e.g., inner or outer diameter) of the second end 79 of the tunnel 32. Accordingly, the step portion 108 enables a changed interface between the second end 79 of the tunnel 32 and the frame 66. In the illustrated embodiment, the first end 76 of the tunnel 32 has a diameter 90 (e.g., inner or outer diameter) between 12 to 50 inches, 18 to 44 inches, 22 to 40 inches, or any specific diameter therebetween. At the first step 108, the tunnel diameter is reduced and has a tunnel diameter 110 between 8 to 48 inches, 14 to 42 inches, 20 to 38 inches, or any specific diameter therebetween. The inner diameter 106 of the second end 79 of the tunnel 32 is between 10 to 46 inches, 16 to 40 inches, 22 to 36 inches, or any specific diameter therebetween. The illustrated tunnel 32 (e.g., stepped tunnel) is disposed between the diverging section 60 and a different diffuser 36 of a different gas turbine engine 12. In the illustrated embodiment, the second diffuser 36 has a diameter 100 (e.g., inner or outer diameter) which may be any suitable size, such as between 34 to 136 inches, 48 to 122 inches, 60 to 110 inches, or any specific diameter therebetween.

FIG. 9 illustrates a method 200 of removing portions (e.g., the first tunnel 32 and the first diffuser 36) of the exhaust collector assembly 14 in preparation of retrofitting using one of the retrofit kits of FIGS. 2-8 in accordance with the embodiments disclosed herein. The method 200 includes disengaging (block 202) the power turbine 12 and the tunnel 32. The method 200 includes detaching (block 204) the back wall 56 of the package's enclosure 30. By removing the back wall 56 of the exhaust enclosure 30, the tunnel 32 and the diffuser 36 can be removed from the exhaust enclosure 30. The method 200 includes uncoupling (block 206) the tunnel 32 from the diverging section 60 (e.g., deflector section). Uncoupling the tunnel 32 may include unbolting the first end 76 of the tunnel 32 from the diverging section 60 (e.g., deflector section). The method 200 includes disengaging the seals 82 of the tunnel 32. Disengaging the seals 82 may include disassembling the turbine frame 80 from the second end 79 of the tunnel 32. The method 200 includes removing the installed tunnel 32 (block 208) from the exhaust collector 30 along the axis 38. The method 200 includes uncoupling (block 210) the diffuser 36 from the turbine 12. Uncoupling the diffuser 36 may include disassembling the diffuser brackets 94 from the exhaust enclosure flanges 88. The method includes disengaging (block 212) the diffuser seal 92. The method 200 includes removing the installed diffuser 36 along the axis 38.

FIG. 10 illustrates a method 300 of installing one of the retrofit kits of FIGS. 2-8 (e.g., installing a different replacement tunnel 32 and a different replacement diffuser 36 after performing the method 200 of FIG. 9) to modify the exhaust collector assembly 14 of FIG. 1 in accordance with the embodiments disclosed herein. The method 300 may include installing (block 302) the replacement diffuser 36 into the exhaust enclosure 30. The method 300 further includes coupling (block 304) the replacement diffuser 36 into place by securing the smaller diameter end 46 of the diffuser 36 to the turbine frame 66 by bolting the diffuser 36 to the turbine frame 66 via one or more bolt and flange connections or brackets. The method 300 includes engaging (block 306) the replacement seal 92 of the replacement diffuser 36. The method 300 includes installing (block 308) the replacement tunnel 32. The method 300 includes coupling (block 310) the first end 76 of the tunnel 32 to the diverging section 60 (e.g., deflector section). Coupling the first end 76 of the tunnel 32 to the diverging section 60 (e.g., deflector section) may include bolting the first end 76 of the tunnel 32 to one or more tunnel flanges 78 at the diverging section 60. The method 300 includes engaging (block 312) the seals 82 at the opposite second end 79 of the tunnel 32. Once the tunnel 32 is installed, the method 300 includes replacing (block 314) the back wall 56 of the exhaust enclosure 30. The foregoing methods 200 and 300 may be used to modify (e.g., retrofit) the exhaust collector assembly 14 to change between any of the embodiments shown in FIGS. 1-8, such that the exhaust collector assembly 14 can be used with any desired gas turbine engine 12 (e.g., switch between different sizes, models, types, etc. having different dimensions at the connection to the exhaust collector assembly 14).

Technical effects of the invention include the ability to use a retrofit kit including the tunnel that enables a particular exhaust system (e.g., an exhaust collector) designed for a larger turbine engine to be used with a different turbine engine by changing an interface between the tunnel and a turbine frame. The retrofit kit includes one or more diffusers having different sizes and interfaces, the tunnel and one or more seal assemblies to reduce leakage of exhaust gas. The tunnel may have straight, tapered, curved, stepwise, or other suitably shaped walls to fit between the exhaust collector and the turbine frame. As a result, the retrofit kit enables exhaust collectors designed for a larger gas turbine engine to be used on other models of gas turbine engines without the need for extensive modifications to the exhaust collector frame or other enclosures for various components of the gas turbine engine power plant.

This written description uses examples to disclose the claimed subject matter, including the best mode, and also to enable any person skilled in the art to practice the subject matter, including making and using any devices or systems and performing any incorporated methods. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method, comprising:
changing a turbine interface of a tunnel of an exhaust collector between a first turbine interface and a second turbine interface, wherein the first turbine interface is configured to couple with a first turbine, the second turbine interface is configured to couple with a second turbine, the first and second turbine interfaces are different from one another, the first and second turbines are different from one another;
wherein changing the turbine interface between the first and second turbine interfaces comprises changing the tunnel between first and second tunnels, wherein the first and second tunnels are geometrically different from one another at least at the turbine interface;
wherein changing between first and second tunnels comprises removing the first tunnel from a diverging section of the exhaust collector, and coupling the second tunnel to the diverging section in the exhaust collector.

2. The method of claim 1, wherein changing the turbine interface between the first and second turbine interfaces comprises changing between the first interface having a first diameter and the second interface having a second diameter, and the first and second diameters are different from one another.

3. The method of claim 1, wherein each of the first and second tunnels comprises one of a cylindrical tunnel, a tapered tunnel, or a stepped tunnel.

4. The method of claim 1, wherein at least one tunnel of the first and second tunnels comprises a variable diameter.

5. The method of claim 3, wherein the at least one tunnel comprises a tapered wall portion having the variable diameter and an angle relative to a longitudinal axis of the at least one tunnel.

6. The method of claim 5, wherein the tapered wall portion extends along at least 10 percent of a length of the at least one tunnel.

7. The method of claim 5, wherein the tapered wall portion extends along at least 50 percent of a length of the at least one tunnel.

8. The method of claim 5, wherein the angle of the tapered wall portion comprises a substantially constant angle relative to the longitudinal axis of the at least one tunnel.

9. The method of claim 5, wherein the angle of the tapered wall portion comprises a variable angle relative to the longitudinal axis of the at least one tunnel.

10. The method of claim 5, wherein the angle is less than or equal to 30 degrees and the tapered wall portion extends along at least 10 percent of a length of the at least one tunnel.

11. The method of claim 1, comprising disconnecting the first tunnel from the first turbine, and connecting the second tunnel to the second turbine.

12. The method of claim 11, comprising disconnecting a first exhaust diffuser for the first turbine from the exhaust collector, and connecting a second exhaust diffuser for the second turbine to the exhaust collector, wherein the first and second exhaust diffusers are different from one another.

13. The method of claim 1, wherein changing the turbine interface of the tunnel of the exhaust collector comprises retrofitting the exhaust collector for the second turbine rather than the first turbine, wherein the retrofitting does not change an enclosure and the diverging section disposed in the enclosure of the exhaust collector.

14. A method, comprising:
removing a first tunnel of an exhaust collector, wherein the exhaust collector comprises an enclosure, a diverging section disposed in the enclosure, and the first tunnel coupled to the diverging section in the enclosure, wherein the first tunnel comprises a first turbine interface configured to couple with a first turbine; and
installing a second tunnel in the exhaust collector, wherein the second tunnel is coupled to the diverging section in the enclosure, the second tunnel comprises a second turbine interface configured to couple with a second turbine, the first and second turbine interfaces are different from one another, and the first and second turbines are different from one another.

15. The method of claim 14, comprising:
disconnecting the exhaust collector from the first turbine; and
connecting the exhaust collector with the second turbine.

16. The method of claim 14, wherein the first and second turbine interfaces have different diameters relative to one another.

17. The method of claim 14, wherein at least one tunnel of the first and second tunnels comprises a variable diameter, a tapered wall portion, a stepped wall portion, or a combination thereof.

18. A method, comprising:
retrofitting an exhaust collector to couple with a turbine at least by changing from a first tunnel to a second tunnel, wherein the first tunnel has a first turbine interface incompatible with the turbine and the second tunnel has a second turbine interface compatible with the turbine;
wherein changing from the first tunnel to the second tunnel comprises removing the first tunnel from a diverging section of the exhaust collector, and coupling the second tunnel to the diverging section in the exhaust collector.

19. The method of claim 18, wherein the first and second tunnels are geometrically different from one another at least at the turbine interface.

20. The method of claim 18, wherein the first tunnel has a first variation in diameter over a first axial length of the first tunnel from the diverging section to the first turbine interface, the second tunnel has a second variation in diameter over a second axial length of the second tunnel from the diverging section to the second turbine interface, and the first and second variations in diameter are different from one another.

* * * * *